(12) United States Patent
Kwon et al.

(10) Patent No.: US 12,485,515 B2
(45) Date of Patent: Dec. 2, 2025

(54) SLURRY ARM AND CHEMICAL MECHANICAL POLISHING APPARATUS INCLUDING THE SAME

(71) Applicant: SAMSUNG ELECTRONICS CO., LTD., Suwon-si (KR)

(72) Inventors: Donghoon Kwon, Suwon-si (KR); Ilyoung Yoon, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 360 days.

(21) Appl. No.: 18/120,209

(22) Filed: Mar. 10, 2023

(65) Prior Publication Data

US 2024/0075581 A1 Mar. 7, 2024

(30) Foreign Application Priority Data

Sep. 1, 2022 (KR) .......................... 10-2022-0110663

(51) Int. Cl.
| | |
|---|---|
| B24B 37/04 | (2012.01) |
| B05B 1/00 | (2006.01) |
| B05B 1/32 | (2006.01) |
| B05B 7/00 | (2006.01) |
| B05B 7/22 | (2006.01) |
| B05B 13/02 | (2006.01) |
| B24B 37/20 | (2012.01) |
| B24B 57/02 | (2006.01) |

(52) U.S. Cl.
CPC ............ *B24B 37/042* (2013.01); *B05B 1/005* (2013.01); *B05B 1/323* (2013.01); *B05B 7/0031* (2013.01); *B05B 7/228* (2013.01); *B05B 13/02* (2013.01); *B24B 37/20* (2013.01); *B24B 57/02* (2013.01)

(58) Field of Classification Search
CPC ..... B24B 37/042; B24B 37/20; B24B 37/005; B24B 37/015; B24B 37/0056; B24B 37/30; B24B 37/04; B24B 37/10; B24B 49/14; B24B 49/16; B24B 49/18; B24B 57/02; B24B 3/02; H01L 21/670147; H01L 21/67092; H01L 21/3212; H01L 21/67051; H01L 21/6708; B05B 1/005; B05B 1/323; B05B 7/0031; B05B 7/228; B05B 13/02; B08B 9/0328
USPC .............................. 451/36, 41, 446, 287, 60
See application file for complete search history.

(56) References Cited

U.S. PATENT DOCUMENTS

| | | | |
|---|---|---|---|
| 6,702,655 B2 | 3/2004 | Chen et al. | |
| 6,860,723 B2 | 3/2005 | Chen et al. | |
| 8,277,286 B2 | 10/2012 | Hung et al. | |
| 8,523,639 B2 * | 9/2013 | Leighton | B24B 57/02 |
| | | | 451/36 |
| 10,832,917 B2 | 11/2020 | Canaperi et al. | |
| 2008/0227297 A1 * | 9/2008 | Matsui | B24B 37/044 |
| | | | 257/E21.244 |
| 2021/0046604 A1 | 2/2021 | Wu et al. | |

(Continued)

*Primary Examiner* — Robert F Neibaur
(74) *Attorney, Agent, or Firm* — Sughrue Mion, PLLC

(57) ABSTRACT

A slurry arm is provided. The slurry arm includes: an arm body; a slurry line that extends through the arm body; an oxygen removal chamber provided in the arm body and configured to receive slurry from the slurry line; a purge gas supplier configured to supply a purge gas to the slurry in the oxygen removal chamber; and a main valve configured to selectively discharge gas from the oxygen removal chamber.

20 Claims, 7 Drawing Sheets

(56) References Cited

U.S. PATENT DOCUMENTS

2021/0283746 A1    9/2021  Moriura et al.
2022/0339757 A1*  10/2022  Zhang .................... B24B 57/02

\* cited by examiner

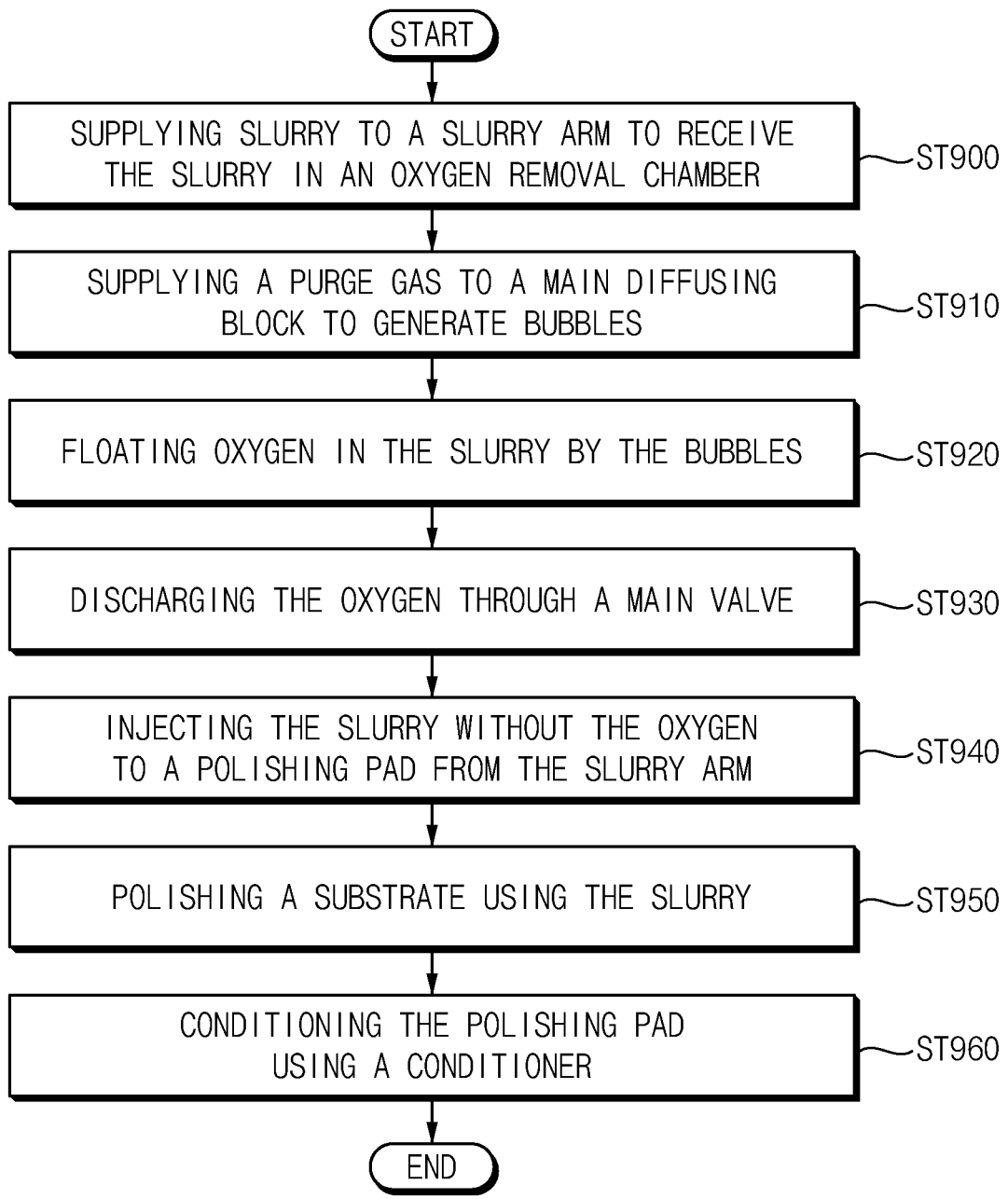

SLURRY ARM AND CHEMICAL MECHANICAL POLISHING APPARATUS INCLUDING THE SAME

CROSS-REFERENCE TO RELATED APPLICATION

This application claims priority to Korean Patent Application No. 10-2022-0110663, filed on Sep. 1, 2022, in the Korean Intellectual Property Office, the disclosure of which is incorporated by reference herein in its entirety.

BACKGROUND

1. Field

Example embodiments relate to a slurry arm and a chemical mechanical polishing apparatus including the same. More particularly, example embodiments relate to a slurry arm configured to supply slurry to a polishing pad and a chemical mechanical polishing apparatus including the slurry arm.

2. Description of Related Art

A layer on a semiconductor substrate may be planarized using a chemical mechanical polishing (CMP) apparatus. The CMP apparatus may include a polishing head configured to hold the semiconductor substrate, a plate arranged under the polishing head, a polishing pad attached to an upper surface of the platen to polish the layer, and a slurry arm configured to supply slurry to the polishing pad.

The slurry may include an oxidizing agent. Oxygen in the slurry arm may be dissolved in the slurry as the slurry passes through the slurry arm. Thus, the slurry may include excessive oxygen, which may corrode the layer, particularly, metal portions of the layer.

SUMMARY

Example embodiments provide a slurry arm that may remove oxygen from slurry.

Example embodiments also provide a chemical mechanical polishing apparatus including the above-mentioned slurry arm.

According to example embodiments, a slurry arm includes: an arm body; a slurry line that extends through the arm body; an oxygen removal chamber provided in the arm body and configured to receive slurry from the slurry line; a purge gas supplier configured to supply a purge gas to the slurry in the oxygen removal chamber; and a main valve configured to selectively discharge gas from the oxygen removal chamber.

According to example embodiments, a slurry arm includes: an arm body; a slurry line that extends through the arm body; an oxygen removal chamber provided in the arm body and configured to receive slurry from the slurry line; a purge gas supplier configured to supply a purge gas to the slurry in the oxygen removal chamber; a pressure gauge configured to measure an internal pressure of the oxygen removal chamber; and a relief valve configured to selectively discharge gas from the oxygen removal chamber based on the internal pressure of the oxygen removal chamber measured by the pressure gauge.

According to example embodiments, a CMP apparatus includes: a polishing head configured to hold a substrate; a platen provided under the polishing head; a polishing pad provided on an upper surface of the platen and configured to polish the substrate; and a slurry arm configured to supply slurry to the polishing pad. The slurry arm includes: an arm body; a slurry line that extends through the arm body; an oxygen removal chamber provided in the arm body and configured to receive the slurry from the slurry line; a purge gas supplier configured to supply a purge gas to the slurry in the oxygen removal chamber; and a main valve configured to selectively discharge gas from the oxygen removal chamber.

According to example embodiments, the purge gas supplier may supply bubbles, which may be formed by the purge gas, to the slurry temporarily received in the oxygen removal chamber to float the oxygen in the slurry. The floated oxygen may be discharged from the oxygen removal chamber through the main valve. Thus, the oxygen in the slurry arm may not be dissolved in the slurry to suppress the excessive oxygen from being contained in the slurry. As a result, only an oxidizing agent in the slurry may be reacted with a metal layer on the substrate to prevent the metal layer from being corroded by the excessive oxygen.

BRIEF DESCRIPTION OF DRAWINGS

The above and other aspects and features of the present disclosure will be more clearly understood from the following description of example embodiments, taken in conjunction with the accompanying drawings, in which:

FIG. 7 is a flow chart illustrating a CMP method using the CMP apparatus in FIG. 1.

DETAILED DESCRIPTION

Hereinafter, example embodiments will be explained in detail with reference to the accompanying drawings.

Figure 1:
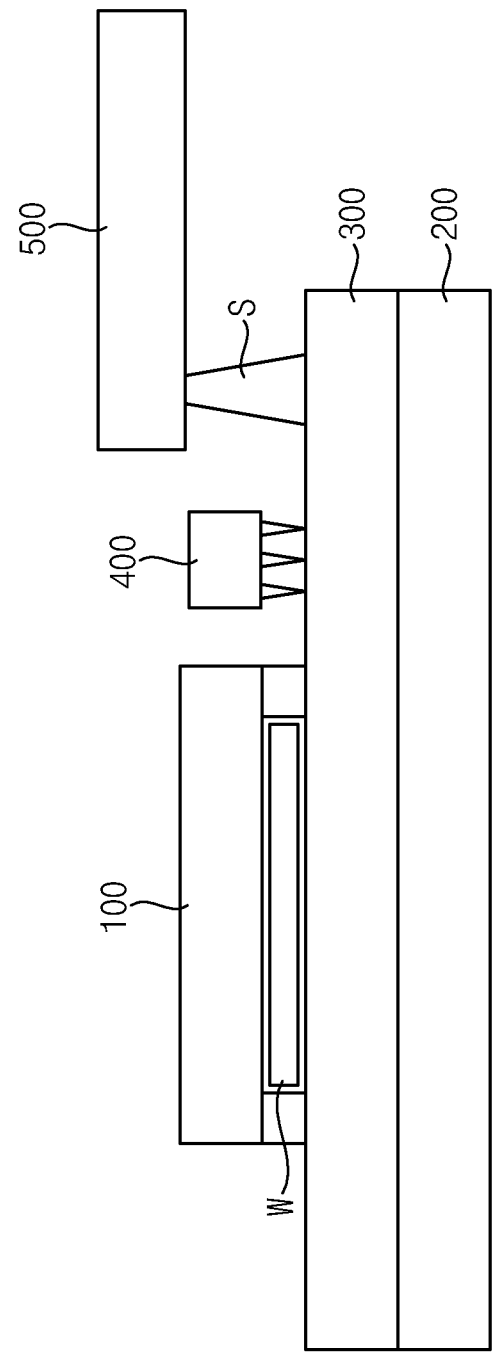
FIG. 1 is a cross-sectional view illustrating a chemical mechanical polishing (CMP) apparatus in accordance with example embodiments.

FIG. 1 is a cross-sectional view illustrating a chemical mechanical polishing (CMP) apparatus in accordance with example embodiments.

Referring to FIG. 1, a CMP apparatus according to example embodiments may include a polishing head 100, a platen 200, a polishing pad 300, a slurry arm 500 and a conditioner 400.

The polishing head 100 may be configured to hold a substrate W. The substrate W may be fixed to a lower surface of the polishing head 100.

The platen 200 may be arranged under the polishing head 100. The polishing pad 300 may be arranged on an upper surface of the platen 200. The platen 200 may be rotated with respect to a vertical axis. For example, the platen 200 may be rotated by an electrical motor. Thus, the polishing pad 300 may also be rotated together with the platen 200 with respect to the vertical axis. The polishing pad 300 may polish a layer, for example, a metal layer on the substrate W using slurry S provided from the slurry arm 500. The slurry S may include an oxidizing agent.

The conditioner 400 may be arranged over the platen 200. The conditioner 400 may include a conditioning disk configured to condition the polishing pad 300.

Figure 2:
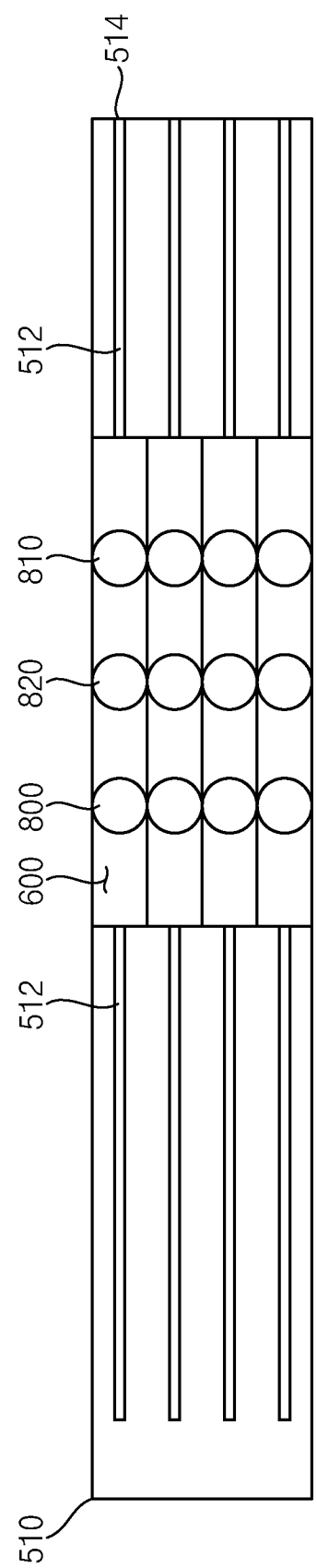
FIG. 2 is a planar cross-sectional view illustrating a slurry arm of the CMP apparatus in FIG. 1.
Figure 3:
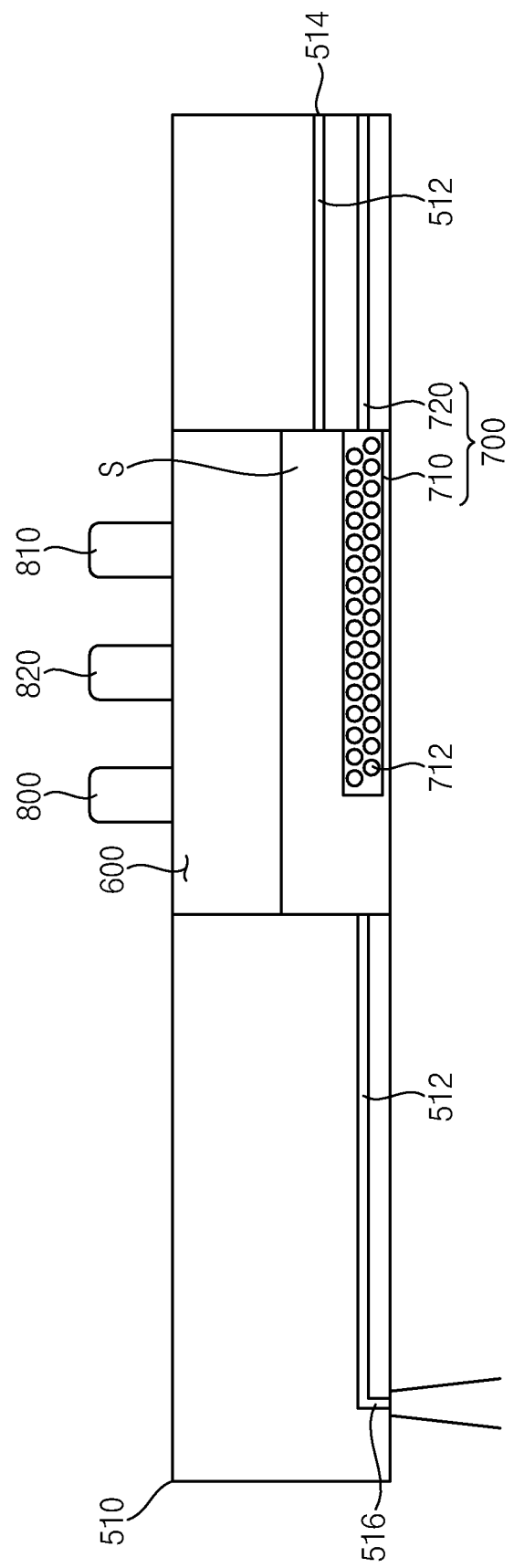
FIG. 3 is a side cross-sectional view illustrating the slurry arm in FIG. 2.
Figure 4:
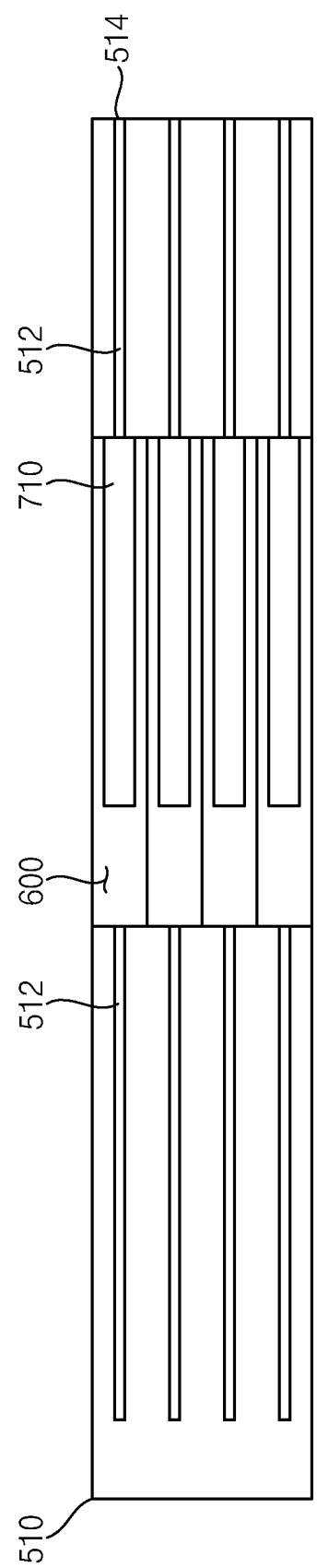
FIG. 4 is a plan view illustrating an oxygen removal chamber and a bubble diffuser in the slurry arm in FIG. 3.

FIG. 2 is a planar cross-sectional view illustrating a slurry arm of the CMP apparatus in FIG. 1, FIG. 3 is a side cross-sectional view illustrating the slurry arm in FIG. 2, and FIG. 4 is a plan view illustrating an oxygen removal chamber and a bubble diffuser in the slurry arm in FIG. 3.

Referring to FIGS. 2 to 4, the slurry arm 500 may include an arm body 510, a plurality of oxygen removal chambers 600, a plurality of purge gas suppliers 700, a plurality of main valves 800, a plurality of auxiliary valve 820 and a plurality of pressure gauges 810.

The arm body 510 may include a plurality of slurry lines 512. For example, as shown, the arm body 510 may include four slurry lines 512. The slurry lines 512 may extend through the arm body 510 in a horizontal direction. Alternatively, the slurry line 512 may be include one slurry line 512, two slurry lines 512, three slurry lines 512, or five or more slurry lines 512.

The arm body 510 may include a slurry inlet 514 and a slurry outlet 516, for each of the plurality of slurry lines 512. The slurry inlet 514 may be formed at a right end of the slurry line 512, and the slurry S may be introduced into the slurry line 512 through the slurry inlet 514. The slurry outlet 516 may be formed at a left end of the slurry line 512, and the slurry S may be injected to the polishing pad 300 through the slurry outlet 516.

The plurality of oxygen removal chambers 600 may be formed in the arm body 510. The plurality of oxygen removal chambers 600 may respectively correspond to the plurality of slurry lines 512. Each slurry line 512 may be connected to a corresponding oxygen removal chamber 600. That is, the oxygen removal chamber 600 may be positioned at a middle portion of the slurry line 512. Particularly, a portion of the slurry line 512 adjacent to the slurry inlet 514 may be connected to a left side surface of the oxygen removal chamber 600. A portion of the slurry line 512 adjacent to the slurry outlet 516 may be connected to a right side surface of the oxygen removal chamber 600. Thus, the slurry S flowing through the slurry line 512 may be temporarily received in the oxygen removal chamber 600. The slurry S may be distributed in a lower region of the oxygen removal chamber 600. The slurry S in the oxygen removal chamber 600 may then flow toward the slurry outlet 516 through the slurry line 512. In example embodiments, the slurry arm 500 may include four slurry lines 512, and four oxygen removal chambers 600.

Each of the plurality of purge gas suppliers 700 may include a purge gas line 720 and a bubble diffuser. The purge gas line 720 may be arranged in the arm body 510. The purge gas line 720 may be parallel to the slurry line 512 between the slurry inlet 514 and the left side surface of the oxygen removal chamber 600, but example embodiments are not limited thereto. The purge gas line 720 may be connected to the left side surface of the oxygen removal chamber 600 to supply a purge gas to the oxygen removal chamber 600. In example embodiments, the purge gas line 720 may be positioned under the slurry line 512, but example embodiments are not limited thereto. The purge gas may include an inert gas. For example, the purge gas may include a nitrogen gas, an argon gas, etc., but example embodiments are not limited thereto.

The bubble diffuser may be arranged in the oxygen removal chamber 600. Particularly, the bubble diffuser may be arranged on a bottom surface of the oxygen removal chamber 600. The purge gas line 720 may be connected to the bubble diffuser to supply the purge gas to the bubble diffuser. The bubble diffuser may extend into the slurry S temporarily received in the oxygen removal chamber 600.

The bubble diffuser may include a main diffusing block 710 and a plurality of main diffusing holes 712. The main diffusing block 710 may be arranged on the bottom surface of the oxygen removal chamber 600. The purge gas line 720 may be connected to the main diffusing block 710 to supply the purge gas to the main diffusing block 710. The main diffusing block 710 may apply a microwave (i.e., electromagnetic radiation with wavelengths ranging from about one meter to one millimeter) to the purge gas to generate a plurality of bubbles of the purge gas. In example embodiments, the main diffusing block 710 may have a rectangular parallelepiped shape extended parallel to the slurry line 512, but example embodiments are not limited thereto.

The main diffusing holes 712 may be formed through the main diffusing block 710. The bubbles generated from the main diffusing block 710 may be supplied to the slurry S in the oxygen removal chamber 600 from the main diffusing holes 712. The bubbles may float oxygen in the slurry S from the slurry S. That is, the bubbles may capture the oxygen in the slurry S. The bubbles with the oxygen may be floated toward an upper region of the oxygen removal chamber 600. Further, a part of the purge gas may also be moved to the upper region of the oxygen removal chamber 600. Thus, a pressure in the upper region of the oxygen removal chamber 600 may be gradually increased by the oxygen and the purge gas.

As shown, the main diffusing block 710 may have a rectangular parallelepiped shape, and the main diffusing holes 712 may be formed through side surfaces of the main diffusing block 710, but example embodiments are not limited thereto. For example, the main diffusing holes 712 may also be formed through an upper surface of the main diffusing block 710.

The pressure gauge 810 may be arranged at the oxygen removal chamber 600. The pressure gauge 810 may measure an internal pressure of the oxygen removal chamber 600. Particularly, the pressure gauge 810 may measure a pressure of the upper region in the oxygen removal chamber 600 in which the oxygen and the purge gas may be positioned. Thus, the pressure gauge 810 may be arranged at the upper surface of the oxygen removal chamber 600.

The main valve 800 may be configured to selectively discharge the oxygen and the purge gas in the oxygen removal chamber 600 in accordance with the internal pressure of the oxygen removal chamber 600 measured by the pressure gauge 810. The main valve 800 may be arranged at the upper surface of the oxygen removal chamber 600, but example embodiments are not limited thereto.

In example embodiments, the main valve 800 may include a relief valve. When the internal pressure of the oxygen removal chamber 600 measured by the pressure gauge 810 is greater than a reference pressure set in the relief valve, the relief valve may be opened. Thus, the oxygen and the purge gas may be discharged from the oxygen removal chamber 600 through the opened relief valve. As a result, the internal pressure of the oxygen removal chamber 600 may be stably maintained so that a flux of the slurry S may also be stably supplied.

The auxiliary valve 820 may be configured to auxiliarily discharge the oxygen and the purge gas in the oxygen removal chamber 600. The auxiliary valve 820 may be arranged at the upper surface of the oxygen removal chamber 600. The auxiliary valve 820 may include a check valve configured to allow the oxygen and the purge gas in the oxygen removal chamber 600 to flow in the discharging direction. For example, the check valve may include a ball valve, but example embodiments are not limited thereto.

Figure 5:
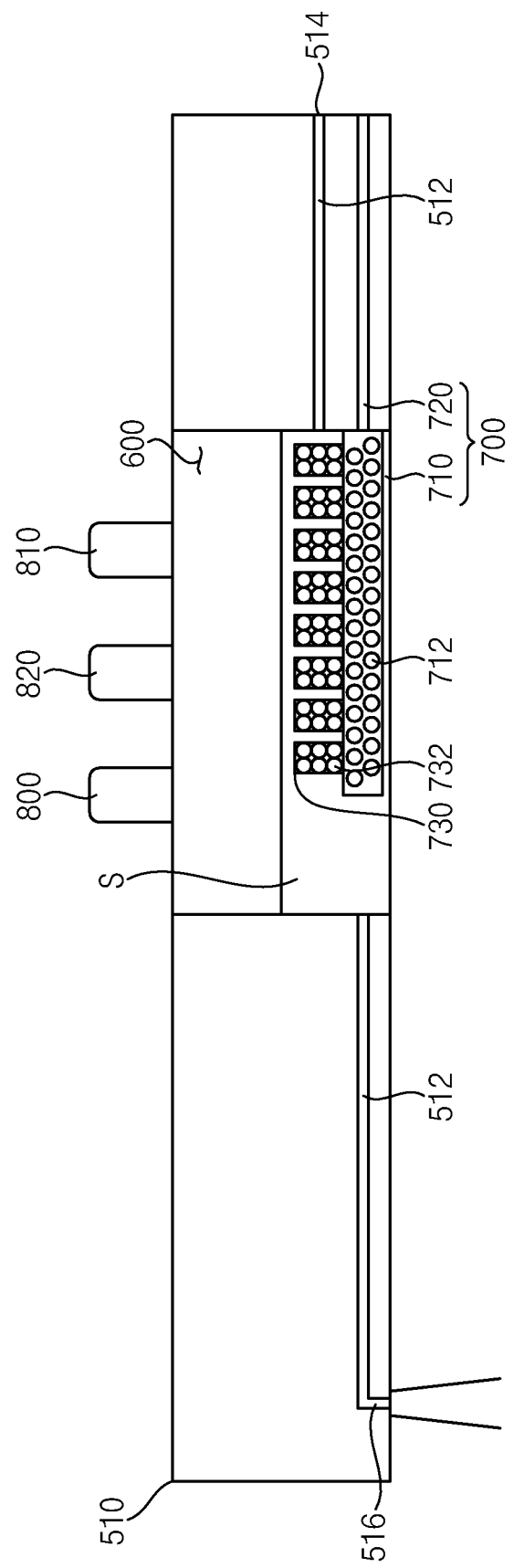
FIG. 5 is a cross-sectional view illustrating a CMP apparatus in accordance with example embodiments.
Figure 6:
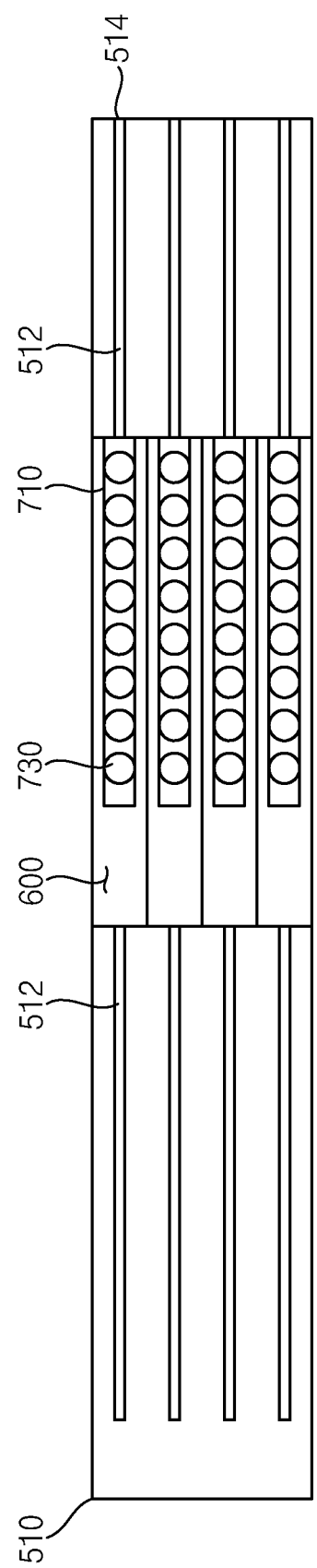
FIG. 6 is a plan view illustrating an oxygen removal chamber and a bubble diffuser in the oxygen removal chamber in FIG. 5.

FIG. 5 is a cross-sectional view illustrating a CMP apparatus in accordance with example embodiments, and FIG. 6 is a plan view illustrating an oxygen removal chamber and a bubble diffuser in the oxygen removal chamber in FIG. 5.

A slurry arm 500 according to example embodiments may include elements substantially the same as those of the slurry arm 500 in FIG. 3 except for the purge gas supplier 700. Thus, the same reference numerals may refer to the same elements and any further illustrations with respect to the same elements may be omitted herein for brevity.

Referring to FIGS. 5 and 6, the purge gas supplier 700 may further include at least one auxiliary diffusing block 730 and a plurality of auxiliary diffusing holes 732.

The auxiliary diffusing block 730 may be arranged on an upper surface of the main diffusing block 710. In example embodiments, eight auxiliary diffusing blocks 730 may be provided on each main diffusing block 710, but example embodiments are not limited thereto. The auxiliary diffusing block 730 may apply the microwave to the purge gas provided through the main diffusing block 710 to generate a plurality of bubbles. In example embodiments, the auxiliary diffusing block 730 may have a cylindrical shape, but example embodiments are not limited thereto.

The auxiliary diffusing holes 732 may be formed through the auxiliary diffusing block 730. The bubbles generated from the auxiliary diffusing block 730 may be supplied to the slurry S in the oxygen removal chamber 600 through the auxiliary diffusing holes 732. The auxiliary diffusing holes 732 may be formed through side surfaces of the auxiliary diffusing block 730, but example embodiments are not limited thereto. For example, the auxiliary diffusing holes 732 may also be formed through an upper surface of the auxiliary diffusing block 730.

FIG. 7 is a flow chart illustrating a CMP method using the apparatus in FIG. 1.

Referring to FIGS. 1 and 7, in operation ST900, the slurry S may be introduced into the arm body 510 through the slurry inlet 514. The slurry S may be received in the oxygen removal chamber 600 through the slurry line 512.

In operation ST910, the purge gas may be supplied to the main diffusing block 710 through the purge gas line 720. The main diffusing block 710 may apply the microwave to the purge gas to generate the bubbles.

In operation ST920, the bubbles may float the oxygen in the slurry S. The floated oxygen and the part of the purge gas may be collected in the upper region of the oxygen removal chamber 600.

In operation ST930, the pressure gauge 810 may measure the internal pressure of the oxygen removal chamber 600. When the internal pressure measured by the pressure gauge 810 is greater than the reference pressure set in the relief valve, the relief valve may then be opened. The oxygen and the purge gas may be discharged from the oxygen removal chamber 600 through the opened relief valve. Thus, the internal pressure of the oxygen removal chamber 600 may be stably maintained to stably supply the flux of the slurry S.

Additionally, the oxygen and the purge gas may be auxiliarily discharged from the oxygen removal chamber 600 through the check valve.

In operation ST940, the slurry S without the oxygen may be injected to the polishing pad 300 through the slurry outlet 516. Thus, only the oxidizing agent in the slurry S may be reacted with the metal layer in an oxygen-reduction reaction. That is, the metal layer may not be corroded by the excessive oxygen.

In operation ST950, the platen 200 with the polishing pad 300 may be rotated. The polishing head 100 may hold the substrate W so that the substrate W contacts the polishing pad 300 to polish the substrate W using the slurry S.

In operation ST960, the conditioning disk of the conditioner 400 may make rotation contact with the polishing pad 300 to condition the polishing pad 300.

According to example embodiments, the purge gas supplier may supply bubbles, which may be formed by the purge gas, to the slurry temporarily received in the oxygen removal chamber to float the oxygen in the slurry. The floated oxygen may be discharged from the oxygen removal chamber through the main valve. Thus, the oxygen in the slurry arm may not be dissolved in the slurry to suppress the excessive oxygen from being contained in the slurry. As a result, only an oxidizing agent in the slurry may be reacted with a metal layer on the substrate to prevent the metal layer from being corroded by the excessive oxygen.

While aspects of example embodiments have been particularly shown and described, it will be understood that various changes in form and details may be made therein without departing from the spirit and scope of the following claims.

What is claimed is:

1. A slurry arm comprising:
   an arm body;
   a slurry line that extends through the arm body;
   an oxygen removal chamber provided in the arm body and configured to receive slurry from the slurry line;
   a purge gas supplier configured to supply a purge gas to the slurry in the oxygen removal chamber, wherein the purge gas supplier comprises a bubble diffuser provided in the oxygen removal chamber and configured to generate bubbles from the purge gas, and the bubbles float oxygen from the slurry to a region of the oxygen removal chamber; and
   a main valve configured to selectively discharge the purge gas and the oxygen from the oxygen removal chamber.

2. The slurry arm of claim 1, wherein the arm body comprises:
   a slurry inlet configured to introduce the slurry into the slurry line; and
   a slurry outlet configured to inject the slurry to a polishing pad of a chemical mechanical polishing (CMP) apparatus from the slurry line.

3. The slurry arm of claim 1, wherein the purge gas supplier comprises:
   a purge gas line connected to the oxygen removal chamber and configured to supply the purge gas to the oxygen removal chamber.

4. The slurry arm of claim 3, wherein the bubble diffuser comprises a main diffusing block provided on a bottom surface of the oxygen removal chamber, and configured to apply a microwave to the purge gas to generate the bubbles, and
   wherein a plurality of main diffusing holes are formed through the main diffusing block to provide the slurry with the bubbles.

5. The slurry arm of claim 4, wherein the main diffusing block has a rectangular parallelepiped shape that extends parallel to the slurry line.

6. The slurry arm of claim 4, wherein the plurality of main diffusing holes are formed through a side surface of the main diffusing block.

7. The slurry arm of claim 4, wherein the bubble diffuser further comprises an auxiliary diffusing block provided on an upper surface of the main diffusing block, and configured to apply the microwave to the purge gas to generate the bubbles, and wherein a plurality of auxiliary diffusing holes are formed through the auxiliary diffusing block to provide the slurry with the bubbles.

8. The slurry arm of claim 7, wherein the auxiliary diffusing block has a cylindrical shape.

9. The slurry arm of claim 7, wherein the plurality of auxiliary diffusing holes are formed through a side surface of the auxiliary diffusing block.

10. The slurry arm of claim 1, wherein the main valve comprises a relief valve.

11. The slurry arm of claim 1, further comprising a pressure gauge configured to measure an internal pressure of the oxygen removal chamber.

12. The slurry arm of claim 1, further comprising an auxiliary valve configured to discharge the purge gas and the oxygen.

13. The slurry arm of claim 12, wherein the auxiliary valve comprises a check valve.

14. A slurry arm comprising:
an arm body;
a slurry line that extends through the arm body;
an oxygen removal chamber provided in the arm body and configured to receive slurry from the slurry line;
a purge gas supplier configured to supply a purge gas to the slurry in the oxygen removal chamber, wherein the purge gas supplier comprises a bubble diffuser provided in the oxygen removal chamber and configured to generate bubbles from the purge gas, and the bubbles float oxygen from the slurry to a region of the oxygen removal chamber;
a pressure gauge configured to measure an internal pressure of the oxygen removal chamber; and
a relief valve configured to selectively discharge the purge gas and the oxygen from the oxygen removal chamber based on the internal pressure of the oxygen removal chamber measured by the pressure gauge.

15. The slurry arm of claim 14, wherein the purge gas supplier comprises:

a purge gas line connected to the oxygen removal chamber and configured to supply the purge gas to the oxygen removal chamber.

16. The slurry arm of claim 15, wherein the bubble diffuser comprises a main diffusing block provided on a bottom surface of the oxygen removal chamber, and configured to apply a microwave to the purge gas to generate the bubbles, and wherein a plurality of main diffusing holes are formed through the main diffusing block to provide the slurry with the bubbles.

17. The slurry arm of claim 16, wherein the bubble diffuser further comprises an auxiliary diffusing block provided on an upper surface of the main diffusing block, and configured to apply the microwave to the purge gas to generate the bubbles, and wherein a plurality of auxiliary diffusing holes are formed through the auxiliary diffusing block to provide the slurry with the bubbles.

18. The slurry arm of claim 14, further comprising a check valve configured to discharge the purge gas and the oxygen.

19. A chemical mechanical polishing (CMP) apparatus comprising:
a polishing head configured to hold a substrate;
a platen provided under the polishing head;
a polishing pad provided on an upper surface of the platen and configured to polish the substrate; and
a slurry arm configured to supply slurry to the polishing pad,
wherein the slurry arm comprises:
an arm body;
a slurry line that extends through the arm body;
an oxygen removal chamber provided in the arm body and configured to receive the slurry from the slurry line;
a purge gas supplier configured to supply a purge gas to the slurry in the oxygen removal chamber, wherein the purge gas supplier comprises a bubble diffuser provided in the oxygen removal chamber and configured to generate bubbles from the purge gas, and the bubbles float oxygen from the slurry to a region of the oxygen removal chamber; and
a main valve configured to selectively discharge the purge gas and the oxygen from the oxygen removal chamber.

20. The CMP apparatus of claim 19, further comprising a conditioner configured to condition the polishing pad.

* * * * *